United States Patent [19]

Mook, Jr.

[11] Patent Number: 4,543,230

[45] Date of Patent: Sep. 24, 1985

[54] PULSED-NEUTRON MONOCHROMATOR

[75] Inventor: Herbert A. Mook, Jr., Oak Ridge, Tenn.

[73] Assignee: The United States of America as represented by the United States Department of Energy, Washington, D.C.

[21] Appl. No.: 480,634

[22] Filed: Mar. 31, 1983

[51] Int. Cl.[4] .......... G01C 1/36

[52] U.S. Cl. .......... 376/110; 376/208; 250/392

[58] Field of Search .......... 250/390-392; 376/110, 208

[56] References Cited

U.S. PATENT DOCUMENTS 3,517,193 6/1976 Mook, Jr. .......... 250/392
3,885,153 5/1975 Schoenborn et al. .......... 250/390

OTHER PUBLICATIONS

Nucl. Instr. Meth., 83(1970), pp. 124-130, Rusticelli.
Nucl. Inst. Meth., 124(1975), pp. 93-99, Freund.
Nucl. Inst. Meth., 137(1976), pp. 23-27, Mikula et al.
Nucl. Inst. Meth., 143(1977), pp. 121-124, Michalec et al. (I), 123(1975), pp. 353-361, (II).
Phys. Rev. Lett., vol. 28A, No. 8, (1/27/69), pp. 546-547, Michalec et al., (III).
Phys. Stat. Sol., 42, (1970), pp. 895-902, Petrzilka et al.
Phys. Stat. Sol., 23A, (1974), pp. 667-673, Michalec et al. (IV).
Nucl. Inst. Meth., 129(1975), pp. 521-525, Vrzal et al.
Rev. Sci. Instr., vol. 23, No. 7, (7/52), pp. 350-356, Selove.

*Primary Examiner*—Sal Cangialosi
*Attorney, Agent, or Firm*—Fred O. Lewis; Stephen D. Hamel; Judson R. Hightower

[57] ABSTRACT

In one aspect, the invention is an improved pulsed-neutron monochromator of the vibrated-crystal type. The monochromator is designed to provide neutron pulses which are characterized both by short duration and high density. A row of neutron-reflecting crystals is disposed in a neutron beam to reflect neutrons onto a common target. The crystals in the row define progressively larger neutron-scattering angles and are vibrated sequentially in descending order with respect to the size of their scattering angles, thus generating neutron pulses which arrive simultaneously at the target. Transducers are coupled to one end of the crystals to vibrate them in an essentially non-resonant mode. The transducers propagate transverse waves in the crystal which progress longitudinally therein. The wave are absorbed at the undriven ends of the crystals by damping material mounted thereon. In another aspect, the invention is a method for generating neutron pulses characterized by high intensity and short duration.

12 Claims, 3 Drawing Figures

PULSED-NEUTRON MONOCHROMATOR

The invention was made as a result of a contract with the United States Department of Energy.

BACKGROUND OF THE INVENTION

This invention relates broadly to neutron monochromators and more particularly to pulsed neutron monochromators for use in time-of-flight neutron spectrometry.

Time-of-flight neutron spectrometers are utilized in various research applications, such as in elastic-neutron-scattering analyses for providing valuable information on dynamic properties of materials. A time-of-flight spectrometer requires a pulsed neutron monochromator for producing pulses of essentially monoenergetic neutrons. Preferably, the monochromators should be capable of producing pulses at a controlled, high repetition rate, the pulses being characterized by both high intensity and very short duration.

The prior art includes mechanical neutron choppers consisting of one or more high-speed rotary discs having apertures for pulsing, or chopping, a neutron beam. Such devices are relatively expensive to construct and maintain; furthermore, they are limited with respect to changing pulse rate or pulse duration. A pulsed-neutron monochromator utilizing a ferrite crystal and a magnetic drive coil therefor is described in U.S. Pat. No. 3,517,193 (June 23, 1970; H. A. Mook et al). That monochromator is subject to some limitations imposed by the small size of ferrite crystals.

The prior art also includes various pulsed-neutron monochromators which utilize nearly perfect single crystals of silicon, silicon dioxide, quartz, and the like. These monochromators are not well suited for time-of-flight spectrometry because they do not generate sufficiently short neutron pulses. In some monochromators, a row of crystals is disposed in a neutron beam, with the crystals positioned to reflect continuous beams of neutrons onto a common target. The various crystals are oriented to define increasingly large scattering angles throughout the row in order to increase the intensity of the reflected beams. Such monochromators are incapable of distinguishing between elastically and inelastically scattered neutrons.

SUMMARY OF THE INVENTION

Accordingly, it is an object of this invention to provide a novel pulsed-neutron monochromator.

It is another object to provide an improved pulsed-neutron monochromator of the crystal type, suitable for time-of-flight spectrometry applications.

It is another object to provide a crystal monochromator for generating neutron pulses characterized by both high intensity and short duration.

It is another object to provide a crystal monochromator useful in the determination of inelastic neutron-scattering cross sections.

It is another object of the invention to provide a new method for generating monochromatic neutron pulses.

In one aspect, the invention is a pulsed-neutron monochromator comprising: (a) a row of elongated neutron-monochromator crystals disposed in a neutron beam, each crystal being oriented to reflect part of the neutrons incident thereon onto a common target, said row including a first crystal and a last crystal, the first crystal being the crystal first intercepting said beam, the crystals in said row defining with said beam a succession of scattering angles which increase in size form the first through the last crystal of said row, and (b) means for successively vibrating the crystals of said row from the last through the first at a frequency which exceeds their natural frequency and differs from harmonics thereof, to generate pulsed reflected-neutron beams.

In another aspect, the invention is a method for generating monochromatic neutron pulses, comprising: (a) providing a row of elongated, nearly perfect single crystals disposed for axial traversal by a neutron beam, said crystals being oriented to reflect incident neutrons onto a common target, said crystals respectively defining neutron-scattering angles with said beam which increase progressively throughout said row, and (b) successively and non-resonantly vibrating said crystals in descending order with respect to the magnitudes of said scattering angles and at a frequency which exceeds their natural frequency and differs from harmonics thereof.

Figure 2:
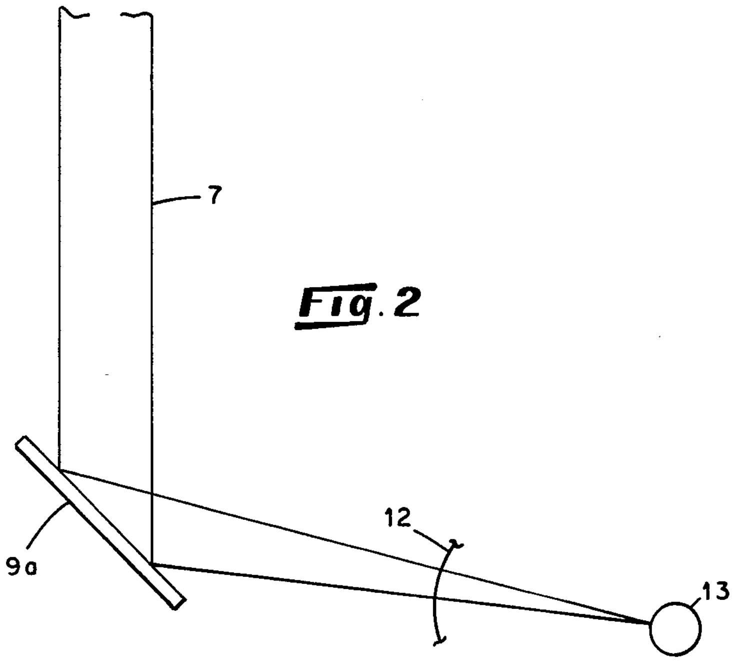
FIG. 2 is a plan view of a typical neutron-reflecting crystal used in the monochromator shown in FIG. 1.

With the exception of the damped crystal illustrated in FIG. 2, the system shown in the drawings may consist of conventional components.

DETAILED DESCRIPTION OF THE INVENTION

Figure 1:
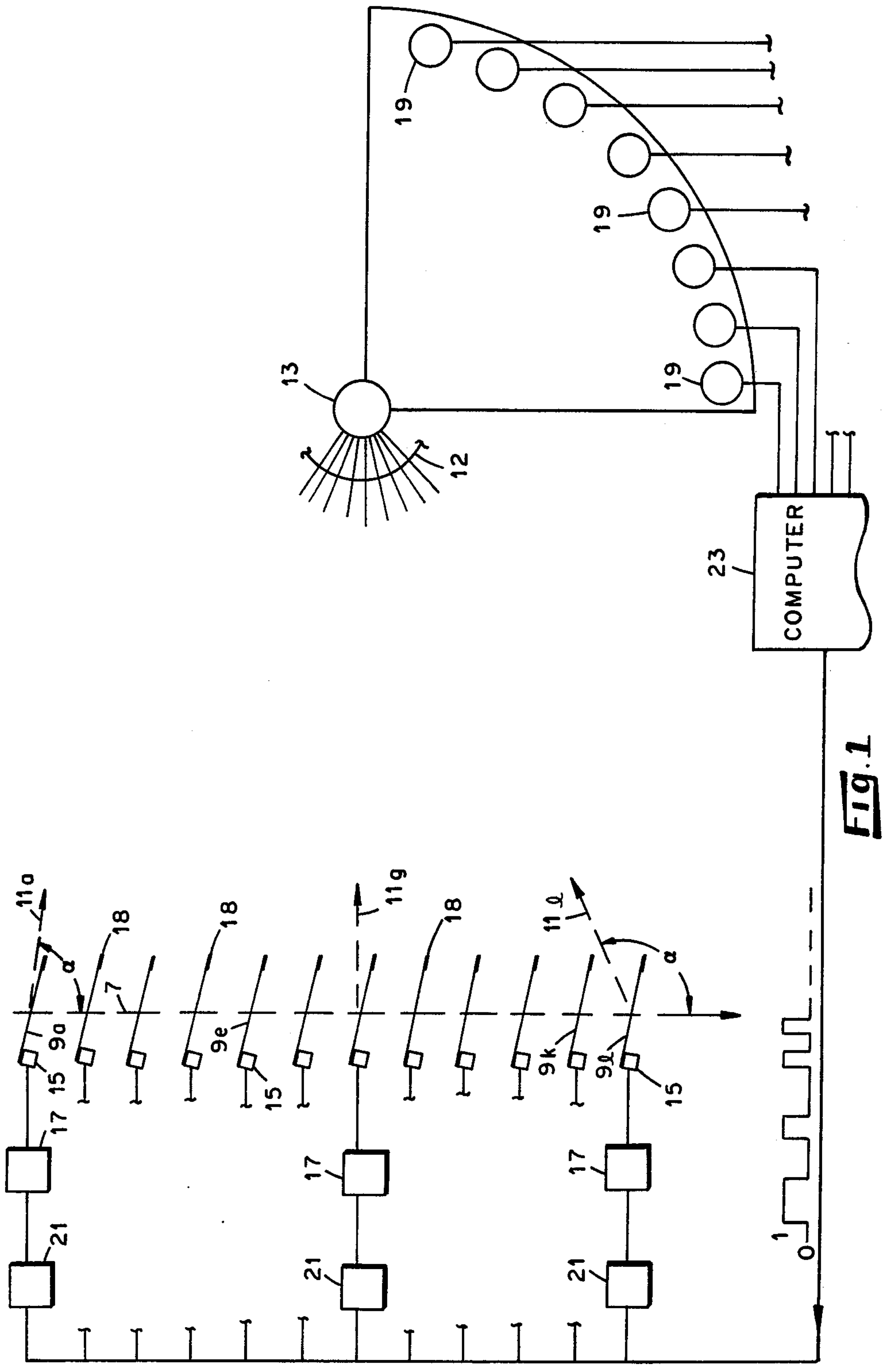
FIG. 1 is a schematic diagram of a pulsed-neutron monochromator designed in accordance with the invention and shown as utilized in a time-of-flight spectrometry application.

Referring to FIGS. 1 and 2, the invention is illustrated as used to convert a polychromatic neutron beam 7 into short-duration, high-intensity monochromatic pulses. The neutron beam is derived from a nuclear reactor (not illustrated). As shown, the monochromator includes a row of rectangular monochromator crystals 9*a*–9*l*, which are positioned to be traversed successively by the beam 7. The term "monochromator crystal" is used herein to refer to nearly perfect single crystals composed of silicon or any other material having good neutron-reflecting properties. Each crystal reflects part of the neutron beam incident thereon, and the crystals are oriented so that their respective reflected rays 11*a*–11*l* are directed onto a common target material 13 via a collimator 12. The various crystals in the row are mounted to define increasingly larger scattering angles a with the beam 7. That is, the scattering angles increase progressively throughout the row, from the first crystal 9*a* through the last crystal 9*l*. This arrangement increases the intensity of the reflected neutron radiation incident on the target.

In accordance with the invention, the crystals 9*a*–9*l* are pulsed, or vibrated, in a manner producing reflected neutron beams characterized by both high intensity and short duration. That is, the crystals are vibrated ultrasonically in a substantially non-resonant mode to decrease "ringing"—i.e., vibration which persists after deexcitation of the crystal. Ringing is eliminated or minimized by a combination of two techniques: (1) Each crystal is pulsed ulstrasonically at a selected frequency which exceeds its natural frequency and differs from harmonics thereof, (2) Vibration of the crystals is produced by inducing transverse vibrations which propagate longitudinally therein.

Figure 3:
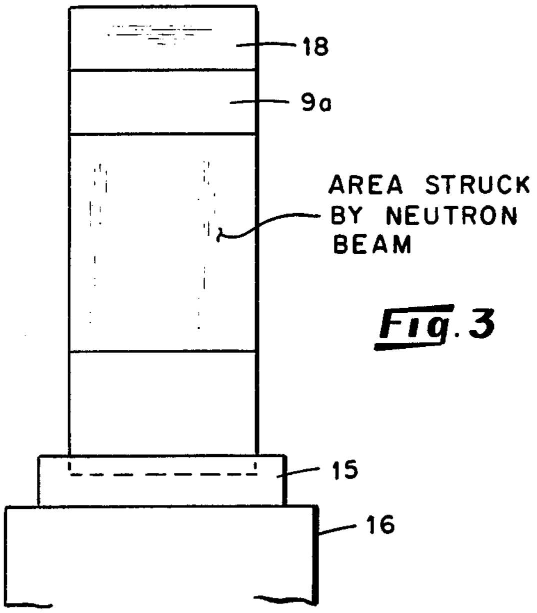
FIG. 3 is a side elevation showing additional details of the crystal illustrated in FIG. 2.

As shown in FIG. 1, electrically driven transducers 15 are mounted to corresponding ends of the crystals. The transducers are respectively coupled to RF-generators 17 for generating sine-wave inputs to the transducers at the above-mentioned selected frequency. The transducers induce transverse waves which progress longitudinally in their respective crystals. As shown in FIG. 3, each crystal is provided with an elastomeric pad 18; this is affixed to the undriven end of the crystal to absorb the above-described waves and minimize buildup of the same. Thus, ringing is minimized by (a) driving the crystals at a suitably high frequency and (b) vibrating the crystals in an essentially non-resonant mode. The result is shorter-duration neutron pulses than would otherwise be achieved.

Referring to FIG. 1, the wavelengths of the neutrons reflected from the various crystals are a function of the scattering angles $\alpha$, the slowest-speed neutrons being those reflected from crystal 9*l*, and the highest-speed neutrons being those reflected from crystal 9*a*. In accordance with the invention, the reflected-neutron intensity is increased by exciting the crystals sequentially and in descending order with respect to the size of their scattering angles. That is, crystal 9*l* is excited first; then, following a preselected time delay, crystal 9*k* is excited; and so on. This mode of exciting the crystals not only increases the reflected-neutron intensity but it also ensures that neutrons scattered elastically from the target 13 will arrive simultaneously at neutron detectors 19 deployed at equal distances from the target. The time delays for the various crystals are provided by variable-time-delay circuits 21, which turn the RF generators 17 on and off. As shown, a computer 23 is connected to receive the outputs from the neutron detectors 19 and to provide an input to the time delays 21. Preferably, a conventional cross-correlation technique for taking data is employed to enhance signal-to-noise ratios. Thus, the computer 23 may be programmed to generate pseudo-random binary pulse sequences—as, for example, the sequence shown in FIG. 1. In some instances where the cross-correlation technique is not employed, the signal from the computer may be a uniform square wave.

In a typical operation, the computer 23 transmits a pulse sequence to the delay circuits 21. After preselected time delays, these circuits turn on their respective RF generators 17. Each generator responds to a pulse sequence by generating wave packets having the desired frequency and having lengths corresponding to the lengths of the input pulses. The output from each generator is fed to its associated transducer 15, causing the latter to vibrate its associated crystal in the manner described. The various crystals are vibrated at nearly identical frequencies and for the same lengths of time. The resulting reflected neutron rays 11*a*–11*l* are collimated and arrive at the target 13 simultaneously. The target scatters the neutrons elastically or inelastically. The elastically scattered neutrons undergo no change in speed, whereas the inelastically scattered neutrons either increase or decrease in speed. As mentioned previously, the elastically scattered neutrons from the target arrive simultaneously at the detectors 10. When excitation of any one of the monochromator crystals is initiated by the computer, a clock is started therein. A neutron event at any detector 19 stops the clock. The computer reads the clock, determines the neutron time-of-flight from the target to the detector, and then determines the neutron energy level corresponding to the time-of-flight. The computer operates in this manner to generate an inelastic-neutron-scattering cross section with respect to energy for each of the detectors 19. The cross section is indicative of various dynamic properties of the target material.

EXAMPLE

A crystal monochromator of the kind described above was tested in a system of the kind illustrated in the drawings. The intensity of the neutron beam directed on the crystal array was about $10^{10}$n/cm$^2$/sec. The crystals 9*a*–9*l* were commercial, nearly perfect single crystals of silicon. The first crystal 9*a* defined a scattering angle of 80° with the beam 1, and the other crystals in the row were positioned to define increasingly larger angles to provide a total scattering angle variance of $1\frac{1}{2}$° for the row. The typical crystal measured $6\times2\times0.1''$. A wafer of buna-N synthetic rubber measuring $1\times2''$ was glued to one face of each crystal at its free end. The transducers 15 were of the conventional $BaTiO_3$ type. They were epoxied to their respective crystals and in turn were supported by a relatively massive member 16. The variable time delays were of the digital type. The typical RF generator was transistorized and included a digital generator and a circuit for converting its output to a sine wave (frequency, approximately one megacycle). The pulse sequence fed to the transistors was similar to that shown in FIG. 1. The computer was a Digital Equipment Corporation PDP-15. The target 13 was spaced about 193 cm from the monochromator. The targets included materials such as $Fe_{75}P_{10}C_{15}$; $Co_4P$; $^4He$; and $^3He$. The detectors were of the $^3He$ type. The target-to-detector distance was 152 cm.

In a typical operation, reflected neutron pulses generated by the monochromators had a length of 10 microseconds. The neutron intensity on the target was $10^6$n/cm$^2$/sec. In similar experiments conducted with arrays of quartz or silicon dioxide crystals, monochromatic neutron pulses characterized by high intensity and short duration were also obtained.

Referring to the invention more generally, the row of monochromator crystals may consist of any suitable number of crystals. The crystals preferably are selected to have a peak reflectivity (reflected-to-incident neutron intensity ratio) exceeding about 75%. They may be composed of a variety of materials, preferably silicon, germanium, quartz, and other materials with good neutron-scattering properties. The vibration dampers for the crystals may be any suitably absorbent material, such as conventional elastomers.

The foregoing description is presented for the purpose of illustration and not limitation. The particular design and operation parameters cited are not necessarily the optimum. It will be apparent that, given the teachings herein, one versed in the art will be able to determine the most suitable parameters for a given application by merely routine experimentation.

What is claimed is:

1. A pulsed-neutron monochromator for use in time-of-flight spectrometry, comprising:

a row of elongated neutron-monochromator crystals disposed in a neutron beam, each crystal being oriented to reflect part of the neutrons incident thereon onto a common target, said row including a first crystal and a last crystal, the first crystal being the crystal first intercepting said beam, the crystals in said row defining with said beam a succession of scattering angles which increase in size from the first through the last crystal of said row whereby the energies of neutrons reflected from said crystals increases successively from said first crystal to said last crystal, and means for sequentially vibrating said crystals of said row in a timed sequence of short duration from said last crystal through said first crystal whereby neutrons reflected from said crystals and elastically scattered from said common target arrive simultaneously at a plurality of neutron detectors deployed in an array at equal distances from said target.

2. The monochromator of claim 1 wherein said means includes vibration-inducing transducers which are connected respectively to said crystals at an end thereof.

3. The monochromator of claim 2 further including ultrasonic-wave damping means, respectively carried by said crystals on the ends thereof remote from said transducers.

4. The monochromator of claim 3 wherein said damping means constitute resilient pads carried by said crystals.

5. A pulsed-neutron monochromator for use in time-of-flight spectrometry, comprising:

a row of elongated single crystals disposed for axial transversal by a neutron beam, each of said crystals being characterized by a peak reflectivity exceeding about 75% and each being oriented to reflect incident neutrons onto a common target, said crystals respectively defining neutron-scattering angles with said beam which increase progressively throughout said row whereby the energies of neutrons reflected from said crystals increases successively from said first crystal to said last crystal, each crystal carrying longitudinal-wave-damping means at one end thereof, electrically driven transducers coupled to the other end of each of said crystals to selectively vibrate each of said crystals in response to an electrical signal, and means for sequentially vibrating said crystals in descending order with respect to the size of their scattering angles whereby nuetrons reflected from said crystals and elastically scattered from said common target arrive simultaneously at a plurality of neutron detectors deployed in an array at equal distances from said target said crystals being vibrated at a frequency which exceeds their natural frequency and differs from harmonics thereof.

6. The monochromator of claim 5 further characterized by said single crystals being nearly perfect crystals of a material selected from the group consisting of silicon, germanium, and silicon dioxide.

7. A method for generating monochromatic neutron pulses, comprising:

providing a row of elongated, nearly perfect single crystals disposed for axial transversal by a neutron beam, said crystals being oriented to reflect incident neutrons onto a common target, said crystals respectively defining nuetron-scattering angles with said beam which increase progressively throughout said row whereby the energies of neutrons reflected from said crystals increases successively beginning with the first crystal in said row which is intersected by said neutron beam, and sequentially and non-resonantly vibrating said crystals in descending order with respect to the magnitudes of said scattering angles in a time sequence whereby neutrons reflected from said crystals reach said common target simultaneously, said crystals being vibrated at a frequency which exceeds their natural frequency and differs from harmonics thereof.

8. The method of claim 7 wherein said crystals have a peak reflectivity exceeding about 75%.

9. The method of claim 8 wherein said crystals are a material selected from the group consisting of silicon, germanium, and silicon dioxide.

10. The method of claim 7 wherein said crystals are respectively vibrated by electrically driven transducers coupled to one end thereof.

11. The method of claim 10 wherein said crystals respectively carry ultrasonic-wave-absorption means at their other ends.

12. The method of claim 11 wherein said absorption means are resilient pads.

* * * * *